Nov. 10, 1936. A. C. FISCHER 2,060,062
AUTOMOBILE ACCESSORY
Filed May 27, 1933
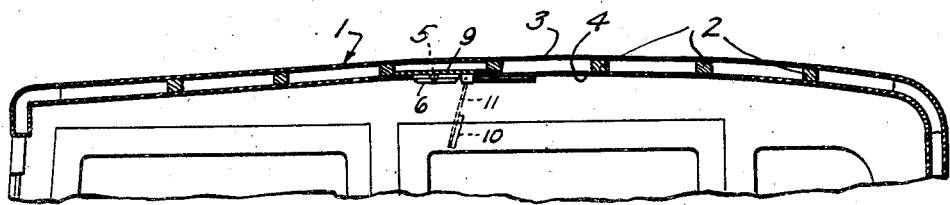
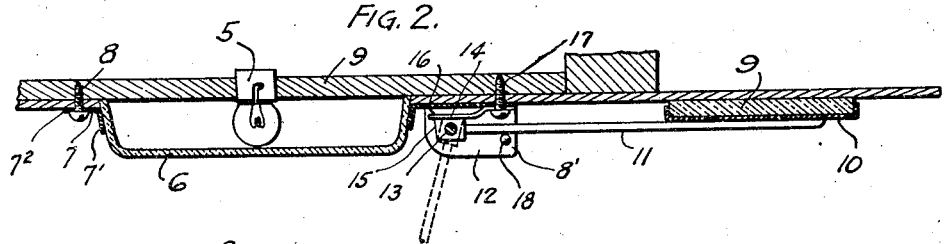
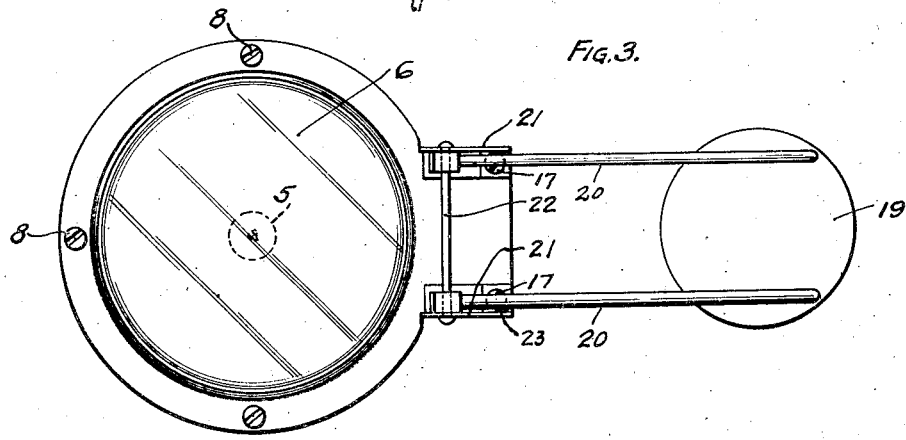
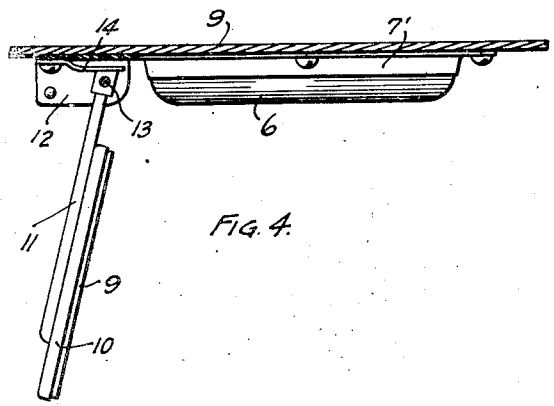
INVENTOR.
ALBERT C. FISCHER
BY
A. ORNEY.

Patented Nov. 10, 1936

2,060,062

UNITED STATES PATENT OFFICE 2,060,062

AUTOMOBILE ACCESSORY

Albert C. Fischer, Chicago, Ill.

Application May 27, 1933, Serial No. 673,268

6 Claims. (Cl. 240—4.2)

This invention pertains to an automobile accessory, and particularly to a mirror attachment which is adapted to be associated with the canopy light in a motor vehicle. This is attached so that it may be readily available for use, especially to the occupants on the rear seat of the motor vehicle.

The invention consists in the features, combinations and arrangements hereinafter described or claimed for carrying out the above stated objects and such other objects as will hereinafter appear in the description.

The invention in general relates to a mirror attached to the inside top of a motor vehicle adjacent the canopy light and which may normally be secured in an inoperative position and yet readily moved to and held in operative position for use. After being used the mirror may then be readily returned to inoperative position and normally held in this position where it is non-obstructive to the view of any of the occupants of the vehicle.

For a better understanding of the invention reference may be made to the accompanying drawing, in which Fig. 1 is a longitudinal, vertical cross sectional view of the top section of a motor vehicle having a canopy light with the mirror attachment embodying the present invention associated therewith;

Fig. 2 is an enlarged detailed view of the light and mirror attachment in Fig. 1;

Fig. 3 is another embodiment of the invention; and

Fig. 4 is still another embodiment of the invention.

Referring specifically to the drawing, numeral 1 designates the top portion or canopy of a motor vehicle which is of conventional design, having a series of cross ribs or frame supports 2 which are covered with an exterior covering 3 and an interior covering 4. A light such as an electric lamp 5 is usually positioned in the center of the canopy for use in the interior of the vehicle, particularly for the benefit of the occupants of the rear seat. The lamp is shielded by a tapered globe 6 which may be attached to the top of the canopy by any suitable attaching means, as for example a metal plate 7 having a flanged portion 7¹ adapted to abut the periphery of the globe and a base flanged portion 7² through which brads or screws 8 are inserted for engaging with foundation board 9 inserted between two of the cross ribs for mounting the lamp thereon.

The present invention aims to provide a mirror attachment associated with the light, this mirror attachment being designated generally by numeral 8¹. The mirror attachment comprises a mirror 9 secured in a plate 10 fitted on one end of arm 11, which may advantageously be pivoted to a base member 12 by means of pivot 13. The base member may be a flange or rib integrally formed on plate 7 or separately made and attached thereto. That end of the arm 11 which accommodates the pivot is provided with two cam faces 14 and 15 arranged on different sides. A spring device 16 is secured in position by means of a brad or bolt 17 and is of a construction to present a flat surface which impinges against the cam surfaces of the arm 11. In this way the spring may engage against the cam surface 14 and secure the mirror in an inoperative position with the face of the mirror against the top of the canopy. When the mirror is desired to be used an occupant of the car may swing it upon the pivot to the dotted lines position, at which cam face 15 will be brought in engagement with the spring, thereby holding the mirror in operative position while same is being used. Thereafter the mirror may be swung back to inoperative position. A stamped bead 18 may be advantageously provided on the member 12 and positioned to project within the path of arm 11 which when swung into inoperative position will be further thus held by means of the bead 18.

The modification in Fig. 4 operates upon the same principle as that above disclosed, but the mirror is so pivoted to the base member that when swung or pivoted in operative position the light is between the occupants of the car and the mirror, whereas in the above described embodiment the mirror is positioned to be between the light and the occupant of the car.

In the embodiment in Fig. 3 mirror 19 is supported upon a pair of arms 20, both of which are pivoted to base flange 21 by means of a pintle rod 22 extending between the flanges. One or both of the flanges 21 may be provided with beads 23 adapted to function in the same manner as beads 18 above described.

The term canopy is not to be understood as limiting the light to any particular position inside the motor vehicle, but would apply to a top light, a side light, or any other light which is positioned within the interior of the vehicle for the convenience of its passengers.

While I have shown the mirror associated with the canopy light it will be obvious that a mirror attachment could in the same manner be attached to lights located on the side of the car as well as upon the canopy. Moreover, while I have described certain preferred embodiments in detail it will be understood that such detailed constructions are for the purpose of illustration and not as limitations of the invention. Various changes may be made in details of construction without departing from the spirit of the invention.

I claim:

1. In combination with a motor vehicle canopy light and shield or globe, a plate for securing the shield or globe in place, a projection formed on the plate, and a mirror pivotally mounted upon the projections and adapted for use by an occupant of the vehicle who is illuminated by said light.

2. In combination with a motor vehicle canopy light and shield or globe, a plate for securing the shield or globe in place, a projection formed on the plate, a mirror pivotally mounted upon the projection and adapted to be swung from inoperative position into operative position in which it faces in a direction adapting it for use by an occupant of the vehicle who is illuminated by said light, and means for holding the mirror in either of said positions.

3. In combination with a motor vehicle canopy light and shield or globe, a plate for securing the shield or globe in place, a mirror pivotally mounted upon the plate and adapted to be swung from inoperative position into operative position in which it faces in a direction adapting it for use by an occupant of the vehicle who is illuminated by said light, and means for holding the mirror in either of said positions.

4. In combination with a motor vehicle canopy light and shield or globe, a plate for securing the shield or globe in place, a mirror pivotally mounted upon the plate and adapted to be swung from inoperative position into operative position in which it faces in a direction adapting it for use by an occupant of the vehicle who is illuminated by said light, and resilient means for holding the mirror in either of said positions.

5. In combination with a motor vehicle canopy light and shield or globe, a plate for securing the shield or globe in place, a mirror pivotally mounted upon the plate and adapted to be swung from inoperative position into operative position in which it faces in a direction adapting it for use by an occupant of the vehicle who is illuminated by said light, and means for holding the mirror in either of said positions.

6. In a vehicle provided with a passenger's seat and an electric light above and in front of the seat, a mirror supporting bracket pivotally mounted at the top of the vehicle between the light and the seat and swingable from an inoperative position parallel to the top of the vehicle to an operative position at a substantial angle thereto, and a mirror mounted on the bracket at a substantial distance from the pivot point thereof, the space between the mirror and its pivot being substantially free of light obstructions, whereby illumination from the light may shine directly upon the face of a passenger even when the mirror is in its operative position.

ALBERT C. FISCHER.